United States Patent [19]
Cuthbert et al.

[11] Patent Number: 5,522,077
[45] Date of Patent: May 28, 1996

[54] OBJECT ORIENTED NETWORK SYSTEM FOR ALLOCATING RANGES OF GLOBALLY UNIQUE OBJECT IDENTIFIERS FROM A SERVER PROCESS TO CLIENT PROCESSES WHICH RELEASE UNUSED IDENTIFIERS

[75] Inventors: Winslow R. Cuthbert, Groton; Craig S. Harris, Acton; Craig R. Leckband, Bedford; Paul A. Martel, Fitchburg, all of Mass.

[73] Assignee: Ontos, Inc., Burlington, Mass.

[21] Appl. No.: 246,065

[22] Filed: May 19, 1994

[51] Int. Cl.$^6$ ............................................ G06F 15/16
[52] U.S. Cl. ................... 395/700; 395/200.03; 395/600; 364/228.3; 364/282.2; 364/282.4; 364/284.4
[58] Field of Search ..................... 375/200, 275, 375/600, 650; 364/200, 900, 700

[56] References Cited

U.S. PATENT DOCUMENTS

| | | | |
|---|---|---|---|
| 4,742,467 | 5/1988 | Messerich et al. | 364/200 |
| 4,775,955 | 10/1988 | Liu | 364/900 |
| 4,792,921 | 12/1988 | Corwin | 364/900 |
| 4,821,184 | 4/1989 | Clancy et al. | 364/200 |
| 4,870,568 | 12/1989 | Kahle et al. | 364/200 |
| 4,930,071 | 5/1990 | Tou et al. | 364/300 |
| 4,943,932 | 7/1990 | Lark et al. | 364/513 |
| 4,989,132 | 1/1991 | Mellender et al. | 364/200 |
| 5,006,978 | 4/1991 | Neches | 364/200 |

(List continued on next page.)

FOREIGN PATENT DOCUMENTS

| | | |
|---|---|---|
| 0546683 | 6/1993 | European Pat. Off. |
| 2253500 | 9/1992 | United Kingdom |
| 9108543 | 6/1991 | WIPO |

OTHER PUBLICATIONS

Comer "Internetworking with TCP/IP" 1991 pp. 11–13, 61–71, 91.
Black "Object Orientation in Operating Systems, 1993 Int'l Conference" 1993 pp. 175–176.
Brennan et al. "Mapping the X Window onto Open Systems Interconnection Stand" May 1991 pp. 32–40.
Wood "Naming & Registration (for OSI Standards)" 1990 pp. 211–215.
"Specification and Implementation of Atomic Data Types" Thesis by William E. Weihl, Massachusetts Institute of Technology, Mar. 1984.

(List continued on next page.)

*Primary Examiner*—Thomas C. Lee
*Assistant Examiner*—Marc K. Weinstein
*Attorney, Agent, or Firm*—Weingarten, Schurgin, Gagnebin & Hayes

[57] ABSTRACT

A system for generating globally unique identifiers for objects in a distributed object oriented database. In one embodiment the system comprises at least two processors connected by means of a network to a processor executing a server process which provides globally unique identifiers for objects throughout the network. Each processor on the network may execute one or more client processes, each of which may run transactions against the database. Each such client process transmits a request to the server process which provides the globally unique identifiers when that client process requires a globally unique object identifier for objects which the requesting client process is creating. In response to the request, the server which provides globally unique identifiers transmits a range of globally unique object identifiers to the requesting client process. The requesting client process then allocates object identifiers from this range of globally unique object identifiers to the objects it is creating. Upon completion of the allocation of the globally unique object identifiers to the objects which have been created, the requesting client process then returns any unused globally unique object identifiers to the server for use by other client processes.

14 Claims, 5 Drawing Sheets

| | | | |
|---|---|---|---|
| 5,117,351 | 5/1992 | Miller | 395/650 |
| 5,159,669 | 10/1992 | Trigg et al. | 395/159 |
| 5,202,981 | 4/1993 | Shackelford | 395/600 |
| 5,218,696 | 6/1993 | Baird et al. | 395/600 |
| 5,235,701 | 8/1993 | Ohler et al. | 395/600 |
| 5,253,189 | 10/1993 | Kramer | 364/578 |
| 5,261,052 | 11/1993 | Shimamoto et al. | 395/200 |
| 5,265,206 | 11/1993 | Shackelford et al. | 364/200 |
| 5,274,815 | 12/1993 | Trissel et al. | 395/700 |
| 5,276,735 | 1/1994 | Boebert et al. | 380/21 |
| 5,276,883 | 1/1994 | Halliwell | 395/700 |
| 5,278,954 | 1/1994 | Hohlfeld et al. | 395/164 |
| 5,280,610 | 1/1994 | Travis, Jr. et al. | 395/600 |
| 5,283,898 | 2/1994 | Kusumoto et al. | 395/650 |

OTHER PUBLICATIONS

"Object–Oriented Computing", Computer IEEE, by D. C. Rine, et al., Oct. 1992.

"Dimensions of Object–Oriented Modeling", Computer IEEE, by P. Wegner, Oct. 1992.

"Object–Oriented And Conventional Analysis And Design Methodologies", Computer IEEE, by R. G. Richman, et al., Oct. 1992.

"Architechture Of An Open Object–Oriented Database Management System", Computer IEEE, by D. L. Wells, et al,. Oct. 1992.

"Object Identity", by S. N. Khoshaflan, et al., Microelectronics and Computer Technology Corporation, pp. 37–46 (undated).

"The Object–Oriented Database System Manifesto", by M. Atkinson, et al., pp. 40–57 (undated).

OBJECT ORIENTED NETWORK SYSTEM FOR ALLOCATING RANGES OF GLOBALLY UNIQUE OBJECT IDENTIFIERS FROM A SERVER PROCESS TO CLIENT PROCESSES WHICH RELEASE UNUSED IDENTIFIERS

FIELD OF THE INVENTION

The invention relates to the field of distributed object oriented databases and more particularly to the generation of globally unique object identifiers for distributed object oriented database systems.

BACKGROUND OF THE INVENTION

Critical to any object oriented database (ODB) is the concept of persistent object identity. In the most general sense, object identity is an inalienable characteristic of an object which can be used to differentiate the object from all other objects, even if other objects are otherwise similar, and to retrieve the object from a persistent storage device such as a magnetic disk and transfer the object into computer memory.

In theory, any pattern of bits can serve to implement the object identifier (OID), so long as that pattern is never used to implement the identity of any other object. Thus, a machine or system which generates unique bit patterns would be sufficient for providing persistent OIDs so long as the same bit pattern was never generated twice. In practice, performance considerations prefer OIDs that are as small as possible and systems which generate OIDs as quickly as possible.

In a distributed computing system consisting of multiple processors executing multiple client processes and interconnected by a network, there is a special challenge in assuring that each client process can locally assign OIDs that are globally unique across all client processes. Typically three basic approaches to this challenge have been attempted.

In the first approach each client process independently generates globally unique OIDs. One typical technique is to form OIDs by concatenating a processor identifier with a date-time stamp. Since each processor on the network has a unique identifier (for the purpose of network communication) and since the date-time stamp is monotonically increasing, each OID created is guaranteed to be unique. In another approach, each client process independently generates locally unique OIDs, which are then changed to globally unique OIDs (if necessary) by an independent agent, such as a central server. In a third approach to the problem, each client process appeals to an independent agent such as a central server to generate globally unique OIDs each time the client process needs to create an object.

Each of these approaches has performance trade-offs. Because the first approach generates globally unique ids (GUIDs) locally, it saves the expense of network communication with a server or coordinating agent that is incurred by the other approaches. However, the price incurred by this lack of communication is that the OIDs in this approach tend to be large. Larger OIDs require more disk storage and also require more time to read, write, and process.

The second approach generates locally unique OIDs (LUIDs) and when these LUIDs happen to be also recognizably globally unique, this approach performs well. However, problems arise in concurrent environments when the LUIDs must be converted or remapped into GUIDs. The cost of this conversion is at least proportional to the number of newly created objects and may be much greater, since all objects which reference newly created objects must have those references converted from LUID to GUID as well.

The third approach avoids both the conversion expense of the second approach, and the large GUIDs of the first approach. However, performance problems associated with this method result from the more frequent communication with the server or coordinating agent than in either of the other approaches. Such frequent communication causes the performance to degrade very quickly in the presence of a large amount of network traffic.

What is required then is a system which will generate globally unique object identifiers without the large GUID size required of locally generated identifiers, without the performance degradation due to identifier conversion, and without the excessive network traffic which typically accompanies the use of an identification server.

SUMMARY OF THE INVENTION

The invention relates to a system for generating globally unique identifiers for objects in a distributed object oriented database. In one embodiment the system comprises at least two processors each of which may execute one or more client processes and each of which is connected by means of a network to a server which provides globally unique identifiers for objects throughout the network.

Each client process on the network may transmit a request to the server which provides globally unique identifiers when the client process requires a globally unique object identifier to identify objects which the requesting client process is creating. In response to the request, the server transmits a range of globally unique object identifiers to the requesting client process.

The requesting client process then allocates object identifiers from this range of globally unique object identifiers. Upon completion of the allocation of the globally unique object identifiers, to objects which it has created, the requesting client process then releases the unused globally unique object identifiers back to the server for use by other client processes.

DESCRIPTION OF THE DRAWINGS

This invention is pointed out with particularity in the appended claims. The above and further advantages of this invention may be better understood by referring to the following description taken in conjunction with the accompanying drawing, in which:

DETAILED DESCRIPTION OF THE INVENTION

Figure 1:
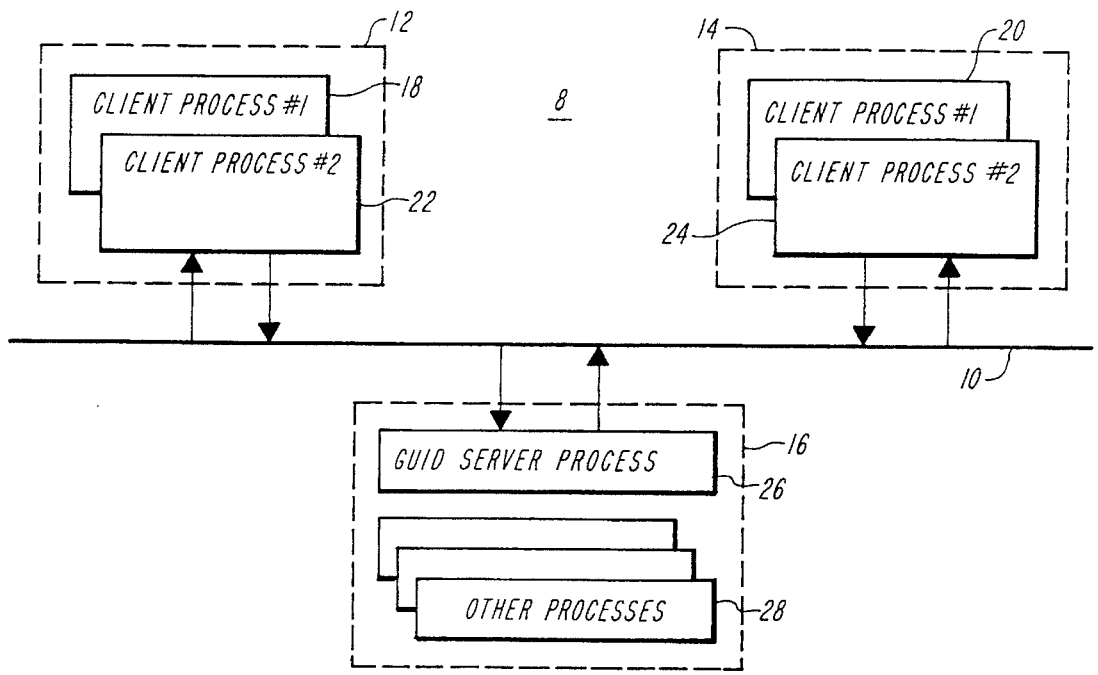
FIG. 1 is a block diagram of an embodiment of the system of the invention.

Referring to FIG. 1, in one embodiment a distributed object oriented database system (ODB) 8 includes a network 10 connecting at least three processors 12, 14 and 16. Processors 12 and 14, in this embodiment, are each executing two different client processes 18, 22 and 20, 24 respectively. These client processes 18, 20, 22, 24 may be different incarnations of a single application program, or they may be different application programs. For the purposes of this discussion, client processes 18, 20, 22, 24 are running concurrently, and each is generating objects and hence using OIDs that must be globally unique.

Processor 16 is executing a server process 26 which provides globally unique identifiers for objects on the network. Server process 26 may perform many functions, but for the purposes of this invention, server process 26 must at least assist in the generation of globally unique OIDs. Server process 26 is hereinafter also referred to as a GUID Server 26. Further, processor 16 executing the GUID server process 26 may be running other unrelated processes 28 and need not be dedicated to the GUID generation task.

Figure 2:
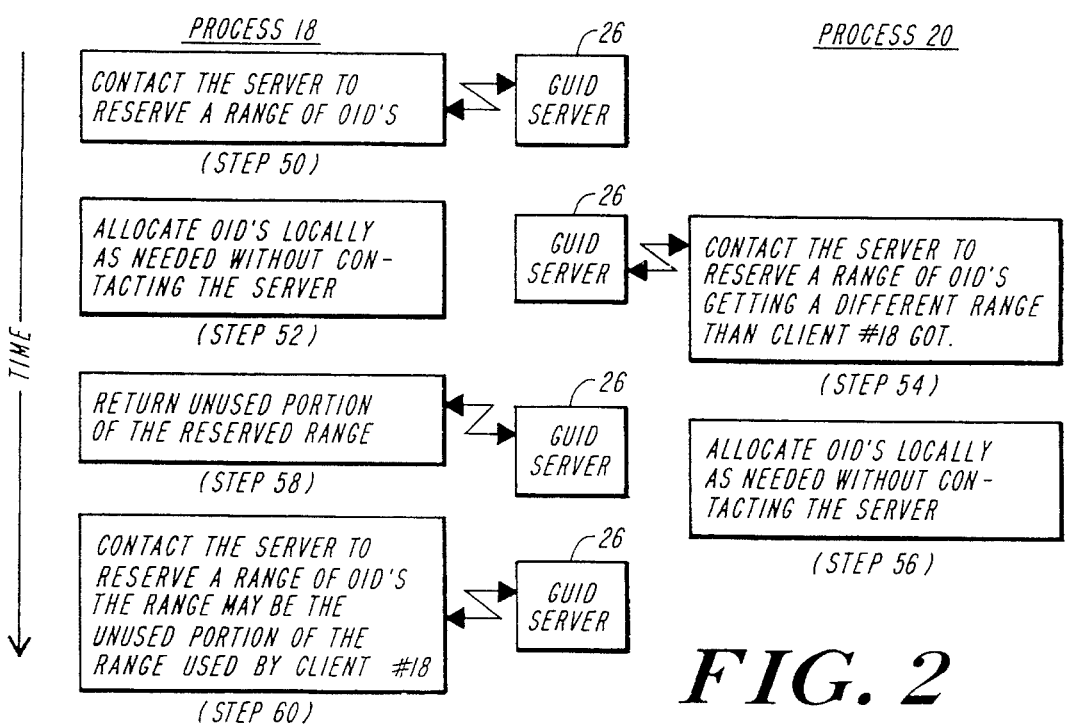
FIG. 2 is a block diagram of the communication between client processes and the globally unique identification server of the invention of FIG. 1.

In brief overview, and referring to FIG. 2, in order to improve performance, the distributed object oriented database system 8 will not require client processes 18, 20, 22, 24 to communicate with the GUID server 26 each time a globally unique object identifier is required. Instead, each client process 18, 20, 22, 24 will request a range of globally unique object identifiers from the GUID server 26 infrequently.

Each time a client process 18, 20, 22, 24 requests a range of globally unique object identifiers from the GUID server 26, the client process 18, 20, 22, 24 is reserving a block of globally unique object identifiers. (Step 50) While a given client process, for example 18, has a range of OIDs reserved, no other client process, for example 20, can use OIDs in that range. Each other client process 20, 22, 24 must reserve its own range instead. This guarantees that no two client processes 18, 20, 22, 24 can assign the same OID to objects it creates, and hence assures global uniqueness.

After reserving a range of OIDs, the client process, for example 18 will locally allocate OIDs out of this range of OIDs to the objects which client process 18 creates. (Step 52) The performance advantage of this method of OID generation accrues from the fact that a client process 18, 20, 22, 24 does not need to communicate with the GUID server 26 each time it needs an OID. In fact, additional requests to the GUID server 26 will only occur when a client process 18, 20, 22, 24 exhausts all the OIDs it previously reserved.

At the same time that client process 18 is allocating OIDs to the objects it is creating, another client process 20 is reserving a different block of globally unique object identifiers. (Step 54) Once client process 20 has received its block of OIDs from GUID server 26, it too may begin allocating OIDs to objects it is creating. (Step 56)

When client process 18 finishes allocating OIDs to objects it creates, client process 18 communicates with the GUID server 26 again to return any unused OIDs from the reserved range. (Step 58) Typically, the number of OIDs actually allocated to objects by a client process 18, 20, 22, 24 will be much smaller than the number reserved for use by the client process 18, 20, 22, 24. After the client process 18 has returned the unused portion of the range of OIDs it previously reserved, GUID server 26 is free to provide the unused OIDs to any client process 18, 20, 22, 24 to honor subsequent reservation requests. (Step 60)

The technique of the invention may also be used to generate unique OIDs in an embodiment in which multiple ODB clients are executed on the same processor. In this embodiment, the client processes and the server process are able to communicate through shared memory. The performance improvement due to the method of the invention in such an embodiment is not as great as it is in an embodiment incorporating a network.

Figure 3:
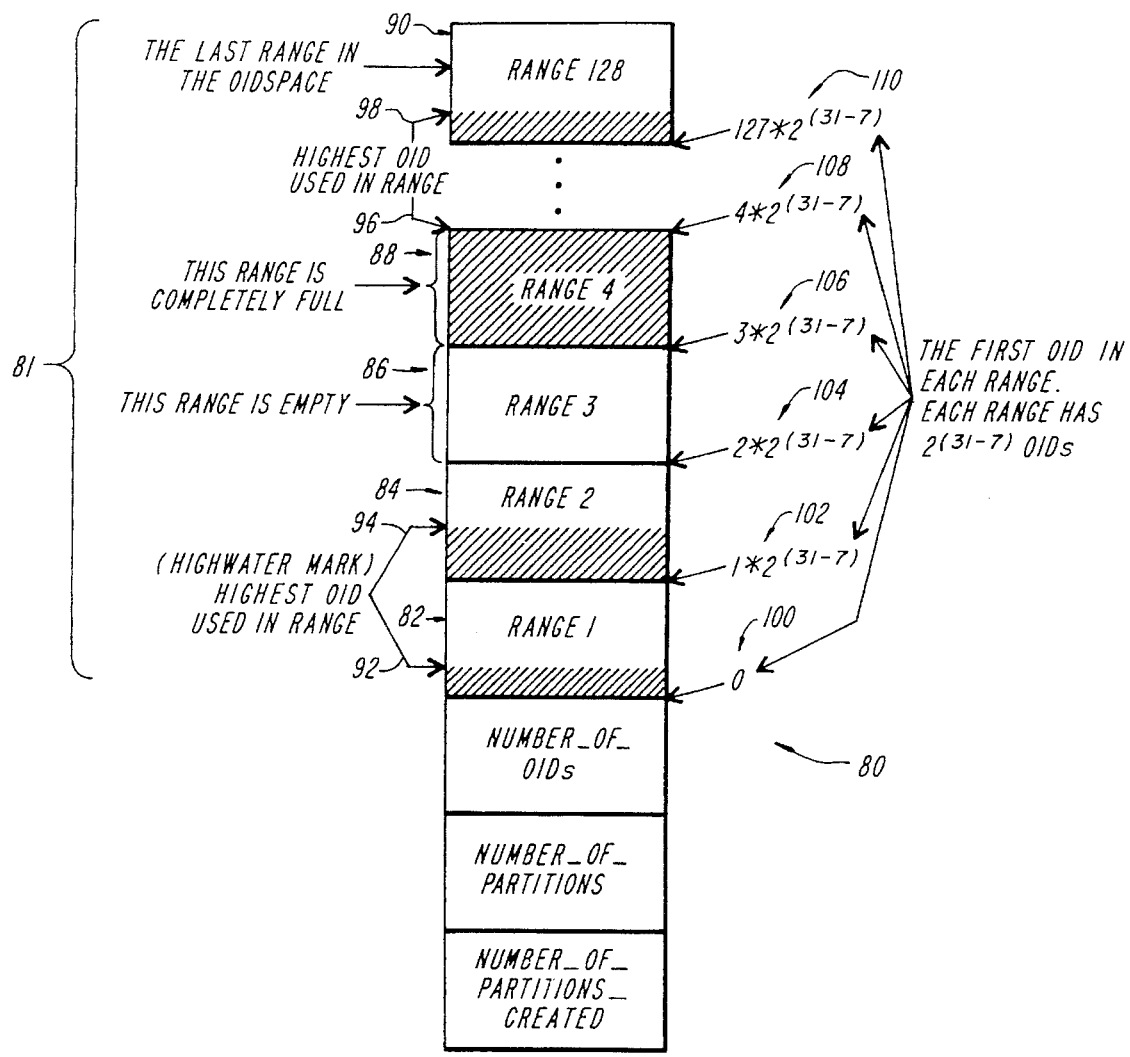
FIG. 3 is a block diagram of the object identifier space of the present invention.

In more detail and referring also to FIG. 3, in the embodiment shown, globally unique OID generation is coordinated by the GUID Server 26 using an object which is referred to as the OID Space 80. A benefit of using the OID Space object is that this object allows multiple client processes 18, 20, 22, 24 executing concurrently on different processors 12, 14, to create new objects with new object identifiers, without the danger of creating duplicate OIDs.

In one embodiment, the invention uses an OID Space object 80 to map sequential integers, from 0 through $2^{31}-1$, into the bit patterns which form the OID. Therefore, the number of valid OIDs in the space is equal to the number of integers in the sequence. This results in what is referred to as the cardinality of the OID Space object 80.

The GUID server 26 partitions the space of all valid OIDs into a number of non-overlapping OID ranges (1 through n) 82, 84, 86, 88, 90 in the OID Space object 80. These are the ranges which are reserved by client processes 18, 20, 22, 24 when object identifiers are required. At any given time, a given range, for example range_1 82, may be reserved by at most one client 18, 20, 22, 24. This means that number of OID Space ranges 82, 84, 86, 88, 90 is equal to the maximum number of client processes 18, 20, 22, 24 which can be generating objects and hence which will require OIDs at the same time.

A client process 18, 20, 22, 24 generally reserves a range of OIDs for the duration of the transaction which is creating objects. At the end of the transaction, when the client process has finished allocating OIDs, the client process 18, 20, 22, 24 records, for each range the client process has reserved, the highest OID 92, 94, 96, 98 that the client process actually allocated. Thus the unused portions of the reserved ranges may then be returned to the GUID server 26 for use by the same or other processes at a later time. If a client process 18, 20, 22, 24 has not used any OIDs in a range that the client process 18, 20, 22, 24 has reserved, the client process 18, 20, 22, 24 simply cancels the reservation.

Both the cardinality of the OID Space object 80 and the number of partitioned ranges are specified at the time the OID Space object 80 is created. Although both the cardinality and the number of partitions may be any natural number (provided the number of partitions is less than or equal the cardinality), the embodiment shown limits both numbers to being powers of 2. This permits the space to be divided into equal ranges and permits the quick computation of the start and end of each range by bit-shift operations.

In the embodiment shown, OID Space object 80 is a data structure comprising three space parameters (Number$_{13}$ Of$_{13}$ OIDs, Number_Of_Partitions, Number_Of_Partitions_Created), which are described below, and a High_Water_Vector 92, 94, 96, 98. The OID Space object 80 has a cardinality of $2^{31}$ and has $2^7$ partitions. Thus the OID Space object 80 depicted is capable of allocating about 2 billion OIDs, partitioned into 128 ranges 82, 84, 86, 88, 90 with about 16 million OIDs per range. Each range 82, 84, 86, 88, 90 has a start OID 100, 102, 104, 106, 110 and an end OID. For all but the last range, the end OID of one range is an OID which is one less than the start OID 102,104,106, 108, 110 of the next subsequent range. FIG. 3 depicts the numerical value of the start of each range, 100, 102, 104, 106, 108, 110. Each range 82, 84, 86, 88, 90 may have a high water mark 92, 94, 96, 98, which indicates the last OID in that range to have been allocated.

It should be noted that one complication of using an OID Space object 80 to generate GUIDs is that the OID Space object 80 must itself have a globally unique identifier. This issue may be addressed in several ways. A first method is to assign an OID in the OID Space object 80 to itself. Thus, for example, assigning the bit string 0 to the OID Space object 80, the first partition would have one less OID than the other partitions, but the first OID would be predetermined to belong to the OID Space object 80. A second method is to simply make the OID Space object 80 one object in a larger OID object space which itself may have a prereserved OID.

Figure 4:
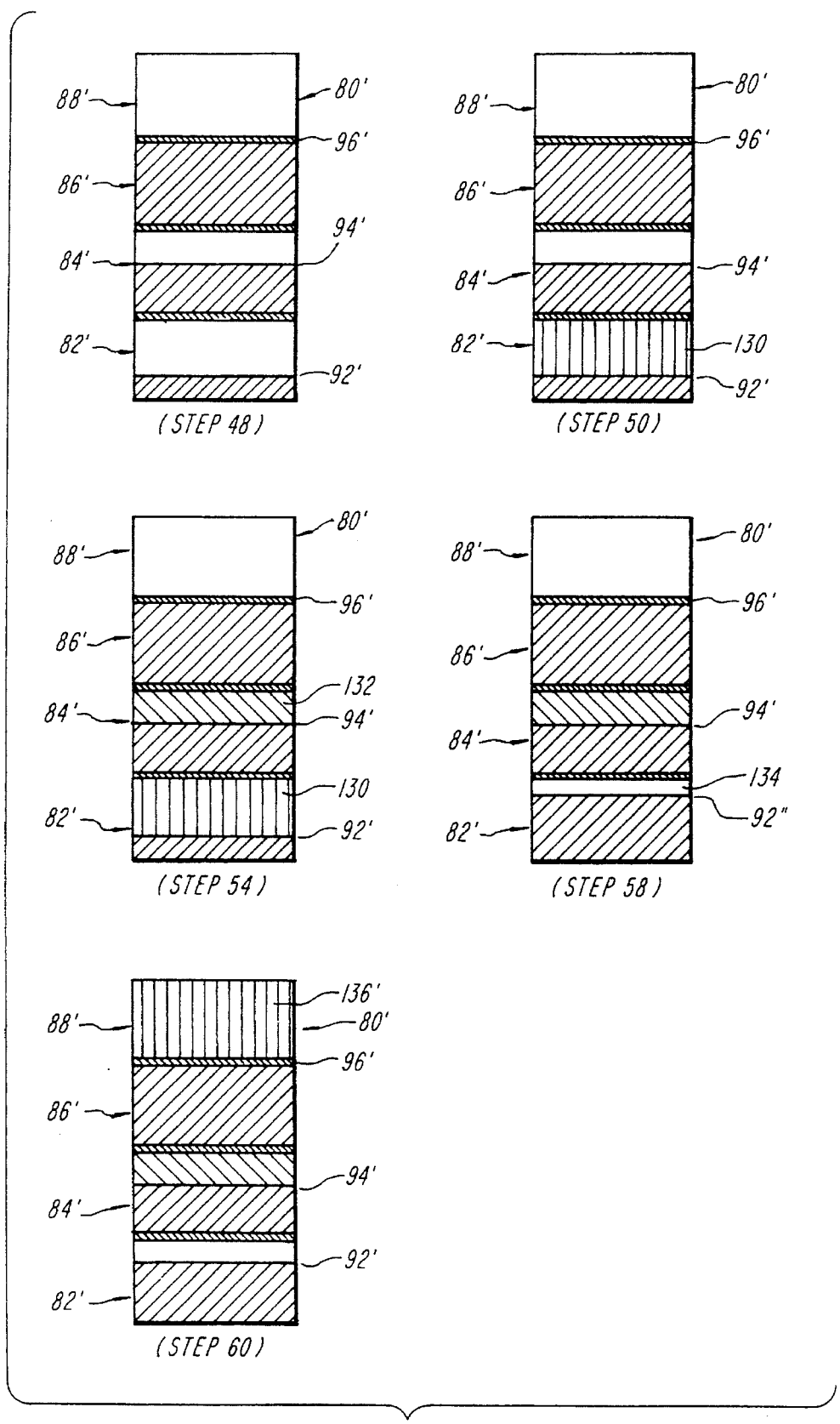
FIG. 4 is a block diagram of a globally unique identification space during the process-server communications shown in FIG. 2.

FIG. 4 depicts the changes in OID Space object 80' as the communication between GUID server 26 and client processes 18 and 20 (as shown in FIG. 2) occur. Initially (Step 48) the OID Space object 80' is partitioned into 4 ranges 82', 84', 86', 88'. Ranges 82', 84' and 86' each have allocated OIDs and hence have high water marks 92', 94' and 96' as indicated. In this example, it should be noted that range 86' has a high water mark 96' which encompasses the entire range 86' and hence no further OIDs may be allocated from it. Conversely, range 88' has no OIDs allocated and hence its high water mark is at its start.

Once client process 18 has contacted GUID server 26 and has reserved a range of OIDs, OIDs 130 in range 82' from the previous high water mark 92' to the end of the range 82' are marked as reserved (Step 50). When process 20 contacts GUID server 26 to reserve a range of OIDs, OIDs 132 in a different range 84' from the previous high water mark 94' to the end of the range 84' are marked as reserved (Step 54). When client process 18 contacts GUID server 26 to return the unused portion of its reserved range 130 (Step 58), the high water mark 92" in range 82' is increased to the level of the last used OID. The OIDs 134 between the new high water mark 92" and the end of the range 82' are then marked as unreserved. If client process 18 then makes a request to the GUID server 26 to reserve a new range of OIDs (Step 60), OIDs 136 from any unreserved range, in this example, 88', may then be allocated.

Figure 5:
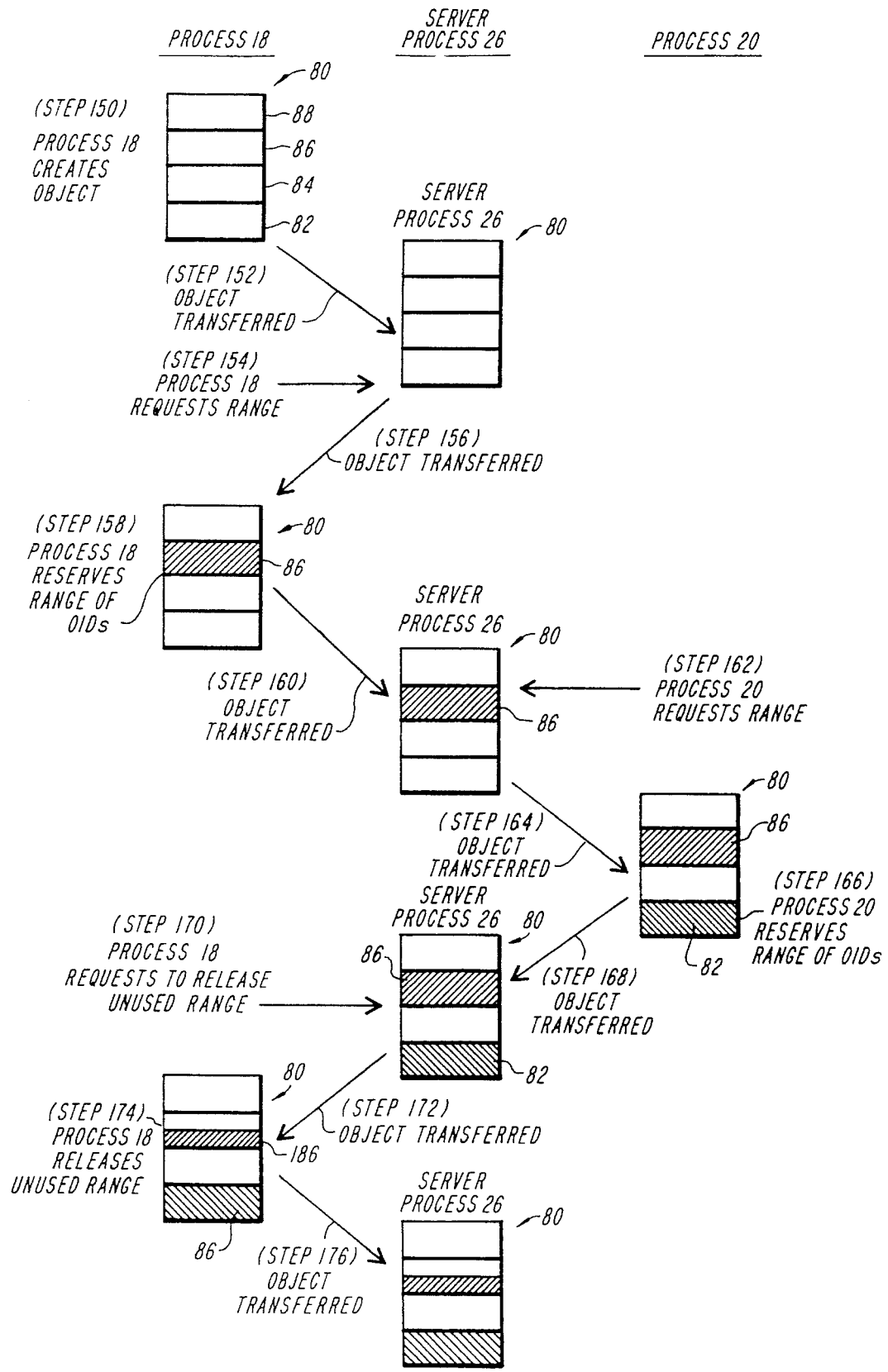
FIG. 5 is a flow diagram of an embodiment of the system of FIG. 1 depicting the creation and transfer of a globally unique object identifier space object between client processes and a server process.

In brief overview, and referring to FIG. 5, in one embodiment of the system for generating globally unique identifiers, a client process 18 creates an OID Space object 80, partitions it into a number of ranges 82, 84, 86, 88, (Step 150) and then transfers OID object 80 to server process 26 (Step 152). Server process 26 is now responsible for storing the OID Space object 80 and for controlling locks on the object that prevent the object from being modified by more than one client process 18, 20 at a time. When client process 18 wishes to reserve a range of OIDs, client process 18 requests a range (Step 154) and, in response, server process 26 institutes a lock on the OID Space object 80 and transfers OID Space object 80 to client process 18 (Step 156).

Client process 18 then reserves range 86 of OIDs (Step 158). Client process 18 therefore has a range of OIDs available for allocation as demarcated by the start and end of the range. At this time, no other concurrent client process can allocate OIDs in the range reserved by client process 18.

Client process 18 then transfers the object 80 back to server process 26, which releases the lock (Step 160) permitting client processes 18, 20, 22, 24 access to OID Space object 80. Client process 18 then allocates an OID from this reserved range of OIDs to each object it creates.

While client process 18 is allocating OIDs, client process 20 requests a range of OIDs (Step 162) and server process 26 again institutes a lock. Server process 26 then transfers the OID Space object 80 to client process 20 (Step 164). Client process 20 then reserves a range 82 of OIDs (Step 166) and returns the OID Space object 80 to server process 26, which releases the lock (Step 168).

When client process 18 wishes to release its unused OIDs, it sends a request to server process 26 (Step 170), which institutes a lock and transfers OID Space object 80 to client process 18 (Step 172). When client process 18 has released the unused OIDs and reset the high water mark 180 (Step 174), the OID Space object 80 is again transferred to server process 26 (Step 176), which releases the lock. The release of unused OIDs is initiated after the client has completed allocating OIDs from its reserved range. This completion usually occurs when the client's transaction completes (either by committing the transaction to disk or aborting) or, although rarely, when the client has exhausted its reserved range and must reserve a new range.

There are two means of returning the reserved range: transmitting to the server the last OID used, and cancelling the reservation. The former is more common, occurring when the client has allocated, to an object, at least one OID from a reserved range. The cancel reservation option is used either when the client has allocated no OIDs from the range or when it intends to abort its transaction. The two means of returning unused OIDs are described more fully below.

Figure 6:
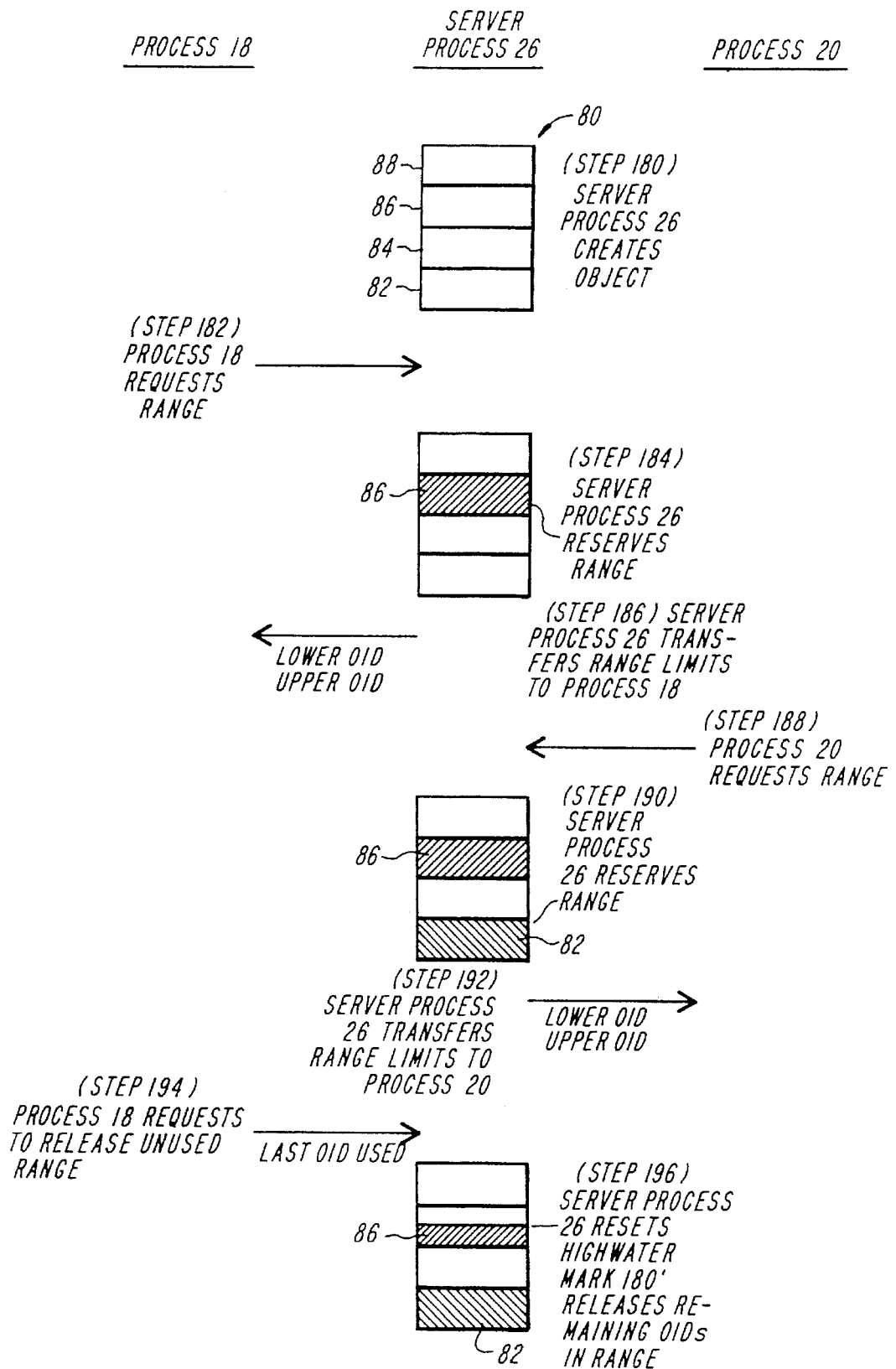
FIG. 6 is a flow diagram of another embodiment of the system of FIG. 1 depicting the transfer of parameter data between client processes and a server process.

Referring to FIG. 6, in an alternative embodiment of the system for generating globally unique identifiers, server process 26 creates an OID Space object 80 and partitions it into a number of ranges 82, 84, 86, 88, (Step 180). Server process 26 is responsible for storing and maintaining the OID Space object.

When client process 18 wishes to reserve a range of OIDs, client process 18 requests a range (Step 182) and, in response, server process 26 reserves a range of OIDs (Step 184) and transfers the OIDs at the lower and upper bounds of the reserved range to client process 18 (Step 186). Client process 18 therefore has a range of OIDs available for allocation demarcated by the start and end of the range. At this point no other concurrent client process 20 can allocate OIDs in the range reserved by client process 18. Client process 18 then allocates an OID from this range of OIDs to each object it creates.

At the same time that client process 18 is allocating OIDs to objects it has generated, process 20 requests a range of OIDs (Step 188). Server process 26 reserves a range of OIDs (Step 190) and transfers the lower and upper OIDs of the reserved range to process 20 (Step 192).

When client process 18 wishes to release its unused OIDs, it sends a request to server process 26 (Step 194), which contains the last OID it used. The release of unused OIDs is initiated after the client process has completed allocating OIDs from its reserved range. Again, this completion usually occurs when the client's transaction completes or, rarely, when the client process has exhausted its reserved range and must reserve a new range.

Again, there are two means of returning the reserved range: transmitting to the server the last OID used, and cancelling the reservation. The former is more common, occurring when the client process has allocated at least one OID from a reserved range to an object which the client process wants to commit to disk. The cancel reservation option is used either when the client has allocated no OIDs from the range or when it intends to abort its transaction. Once the reserved range has been returned, server process 26 resets the high water mark 180' (Step 196) and releases the remaining OIDs in the range for use.

"in-use" indicator. That is, if that bit is set (1), the OID range represented by that location has been reserved. If the bit is 0, the range is available to be reserved. In an alternative embodiment, these bit flags, one per OID range, are stored in a separate vector.

The following pseudocode demonstrates an embodiment of the implementation of this function:

```
//define maximum and minimum values
define MAXIMUM_OID_SIZE as 31 //default maximum OID size
define MINIMUM_OID_SIZE as 8 //default minimum OID size
//determine whether to use default values
set NUMBER_OF_OIDS to minimum of Number_Of_OID_Bits and
                MAXIMUM_OID_SIZE
set  NUMBER_OF_OIDS    to   maximum   of   NUMBER_OF_OIDS
                and    MINIMUM_OID_SIZE
set    NUMBER_OF_PARTITIONS   to   maximum   of
                NUMBER_OF_PARTITION_BITS
                and NUMBER_OF_OIDS
set NUMBER_OF_PARTITIONS_CREATED to $2^{NUMBER\_OF\_PARTITIONS}$
allocate High_Water_Vector to hold
    (Number_of_Partitions_Created) times
    (Number_of_OIDs + 1) bits
//initialize high water mark for each partition to the
//last OID used, which will have 0 in the low order bits
for each slot in High_Water_Vector
    begin_for
    set value at slot to slot*$2^{(NUMBER\_OF\_OIDS\_NUMBER\_OF\_PARTITIONS)}$
    end-for
```

FUNCTIONS COMMON TO EITHER EMBODIMENT

To implement either of these embodiments, the following functions are executed either by the client process 18, 20, 22, 24 (for the first embodiment) or the server process 26 (for the alternative embodiment).

Create and Partition an OID Object:

A function termed, Create_OID_Space_Object, of the form [Create_OID_Space_Object (Number_of_OID_Bits, Number_of_Partition_Bits)] creates an OID Space and partitions the space into a number of ranges. The Number_of_OID_Bits parameter defines the number of bits which form the OID. In one embodiment the number of bits in an OID is set to 31 by default and hence the OID Space contains $2^{31}$ (~2 billion) OIDs. This default value assures that by default, the OIDs created will fit into a 32-bit long word. However, there is no theoretical upper bound on the size of OID. It should also be noted that one can place a lower bound on the size of an OID as well. In one embodiment a value of Number_Of_OID_Bits of less than eight bits is rounded up to eight.

The Number_of_Partition_Bits parameter defines the maximum number of client processes which can each reserve a range of OIDs concurrently, and hence is equal to the number of partitions in the OID Space object 80. In one embodiment the default value permits 128 partitions, so as many as 128 client processes can each reserve a range of OIDs concurrently.

In addition, the creation of the OID Space object 80 also results in the creation of a data structure termed a High_Water_Vector 81, which is a vector array. Each entry in the vector represents a particular partition or OID range. Thus in the default example above, the vector would be 128 locations long; one location for each of the 128 partitions. The number stored in a given location in the vector is the current largest OID which has been allocated from the range which corresponds to that entry location. In one embodiment, the high order, most significant bit (for example bit 32, for a 31 bit OID) of each location in the vector is interpreted as an The parameters (Number_Of_OIDs, Number_Of_Partitions, Number_Of_Partitions Created) are attributes of the data structure of OID Space object 80 (FIG. 3).

Reserve a Partition:

A function termed, Reserve_Partition, of the form [Reserve_Partition (Beginning_OID, Ending_OID)] reserves a range of object identifiers. In one embodiment the function is a Boolean function which returns TRUE if the reservation is successful and FALSE if no range can be reserved. The FALSE return occurs only when all partitions are in use, or when those that are not in use have been exhausted. If the reservation is successful, the function sets the output parameters Beginning_OID and Ending_OID to the starting and ending OIDs respectively in the reserved partition or range. If this function is executed by a client process 18, 20, 22, 24, this function is followed immediately by the returning of the OID Space object 80, back to the server process 26, in order to release the lock and make the OID Space object 80 available for other users.

The following pseudocode demonstrates an embodiment of the implementation of this function:

```
for each partition
    begin-for
    if not (partition exhausted or partition reserved)
    then
        begin-then
        set Beginning_OID to partition's high water mark+1
        set Ending_OID to 1 less than start next partition
        mark partition as being reserved
        return true
        end-then
    end-for
return false
```

Cancel a Reservation:

A function termed, Cancel_Reservation, of the form [Cancel_Reservation (An_OID_In_Reserved_Range)] cancels the reservation for the range of OIDs that contains the OID referenced in the parameter An_OID_In_Reserved_Range. In one embodiment, this function is a Boolean function which returns TRUE if the cancellation is successful and FALSE if the cancellation failed because the OID in the parameter An_OID_In_Reserved_Range is not in a reserved range.

In the first embodiment described, the use of this function permits the client process 18, 20, 22, 24 to clear the high order bit in the High_Water_Vector 81 to indicate that the partition containing An_OID_In_Reserved_Range is no longer reserved, prior to transferring the OID Space object 80 from the client process 18, 20, 22, 24 to server process 26. In the second embodiment described, the server process 26 does not need to update the high water mark, since the Cancel_Reservation function indicates that no OIDs were allocated by the client process 18, 20, 22, 24. However, the partition containing An_OID_In_Reserved_Range is marked as unreserved.

The following pseudocode demonstrates an embodiment of the implementation of this function:

```
find partition containing An_OID_In_Reserved_Range
if (partition reserved)
then
    begin-then
    mark partition as being unreserved
    return true
    end-then
return false
```

Set the New High Water Mark

A function termed, Set_New_High_Water_Mark, of the form [Set_New_High_Water_Mark (New_High_Water_Mark)] is intended for use in conjunction with the Reserve_Partition function. The parameter New_High_Water_Mark designates the last OID allocated by a client process 18, 20, 22, 24.

Thus, for example, a client process 18, 20, 22, 24 first reserves a range of OIDs with the Reserve_Partition function, then allocates OIDs from that range as needed when new objects are created, and finally, uses Set_New_High_Water_Mark to record the highest OID allocated at the end of a transaction. Upon the successful completion of the function, a subsequent call to Reserve_Partition will return a start value which is one greater than the previous high water mark.

The following pseudocode demonstrates an embodiment of the implementation of this function:

```
find partition containing New_High_Water_Mark
if (partition reserved and New_High_Water_Mark > previous
        high water mark)
then
    begin-then
    remember New_High_Water_Mark
    return true
    end-then
otherwise
    begin-otherwise
    return false
    end-otherwise
```

Locate the High Water Mark

A function termed Locate_High_Water_Mark, of the form [Locate_High_Water_Mark (Partition_Number)] returns the last OID allocated within the specified Partition_Number. The function can also be used to determine whether a given OID has been allocated yet. If a given OID is above the high water mark for its respective partition, it has not been allocated. If the OID is below the high water mark, it has been allocated, although there is no guarantee that it is still in use by an object.

The following pseudocode demonstrates an embodiment of the implementation of this function:

```
if (Partition_Number > number of partitions)
then
    begin-then
    error
    end-then
Return contents of the High_Water_Vector for the
        Partition_Number
```

First OID in Range

A function termed Get_First_OID_In_Range, of the form [Get_First_OID_In_Range (Partition_Number)] returns the first OID of the partition specified by Partition_Number. This function is implemented such that the first OID of the range is returned whether or not it has already been allocated. One use for Get_First_OID_In_Range is to find all the OIDs in use, but it is also used to find the last OID in the previous partition.

The following pseudocode demonstrates an embodiment of the implementation of this function:

```
if (Partition_Number > number of partitions)
then
    begin-then
    error
    end-then
shift Partition_Number left by (NUMBER_OF_OID_BITS -
        NUMBER_OF_PARTITION_BITS) + 1 bits
return result
```

ADDITIONAL FUNCTIONS REQUIRED FOR THE FIRST EMBODIMENT

In the first embodiment, the transferring of the OID Space object 80 between the client processes 18, 20, 22, 24 and server process 26 requires that the server process 26 be able to institute locks on the OID Space object 80 to prevent the object 80 from being changed by more than one client process 18, 20, 22, 24 simultaneously. One method of providing a lock for object 80 is by making object 80 an instant update object (IUO).

An instant update object is an object with the property that changes can be made to the object by one client application at a time and once these changes are complete, they become immediately visible to other client applications regardless of the current transaction mechanism. This is true even if the modifying client's transaction is not complete or even if the modifying client's transaction ultimately aborts. It should be noted that the treatment of an object as an IUO need not be inherent to the object or the object's type. In one embodiment, an object is an IUO if and only if it is locked with a particular kind of lock, called an Instant Update Lock.

By allowing updates made by one client to be immediately visible to other clients, IUOs provide a very high degree of concurrency. The method for OID generation described herein requires this kind of high concurrency. Specifically, the OID Space object 80 is treated as an IUO so that when one client modifies the OID Space object 80 so as to reserve a range of OIDs, other clients see the modified OID Space object 80 so as to avoid reserving the same range but are not precluded from immediately reserving other ranges.

Although IUOs allow clients to see modifications to the object that have been made by others, IUOs must prevent clients from seeing modifications that are in the process of being made. Therefore, the purpose of locking the OID Space object 80 with an Instant Update Lock is twofold. First, the existence of an Instant Update Lock informs the server process to treat the locked object as an IUO. Second, the presence of the Instant Update Lock also blocks any other clients from reading the OID Space object 80 until it is released.

The presence of such locks produces an additional complication which must be dealt with. For example, consider that two client applications called client application 1 (CA1) and client application 2 (CA2) require access to two objects called obj1 and obj2 with Instant Update Locks. Suppose that CA1 locks obj1 and CA2 locks obj2. When CA1 then tries to lock obj2, it will be blocked (as described above) because CA2 has obj2 locked. When CA2 then tries to lock obj1, it will be blocked because CA1 has obj1 locked. Both applications could thus be blocked forever, each waiting for the other to release its Instant Update Locks. To avoid this situation (called a deadlock or deadly embrace), one embodiment requires that when a client application acquires an instant Update lock, it must make its modifications and release the lock before acquiring any other locks. When a client application attempts to acquire a lock while holding an instant Update Lock, an error condition occurs.

The server process maintains each instant update object as an element (an IUO_List Element) in a list. Each IUO_List Element contains the globally unique identifier of an object (that is, the OID space object), a pointer to the disk representation of the object (the OID space object), an indication of whether the OID space object is modified, and if locked, a pointer to the transaction which has locked the underlying OID space object. Each IUO_List Element contains a reference to the next IUO_List Element the list. There is a static pointer to the start of the list.

SERVER FUNCTIONS

The following server functions, read, write, commit and abort, handle access to data on the persistent storage device.

Server Read Procedure

The function, Server_Read_Procedure, of the form [Server_Read_Procedure (OID, Lock_Type)] reads an OID Space object 80, having an OID as indicated in parameter OID, and locks the OID Space object 80 with a lock of the type specified in parameter Lock_Type.

The following pseudocode demonstrates an embodiment of the implementation of this function:

```
if (Lock_Type is an Instant_Update_Lock)
then
    begin-then
    look for IUO_List_Element containing the requested OID
    if (IUO_List_Element found)
    then
        begin-then
        if (IUO_List_Element locked by another process)
        then
            begin-then
            indicate that client process should wait until
                lock is released
            end-then
            set IUO_List_Element locker to requesting
                process
        end-then
    end-then
    else (IUO_List_Element not found)
        begin-else
        create IUO_List_Element
        insert new IUO_List_Element into IUO_LIST
        for each partition of OID_Space_Object
            mark partition as not reserved
        end-else
    if (IUO not in memory)
        then
            begin-then
            read latest state of IUO from disk
            end-then
    end-then
return OID Space object to client
```

Server Write Procedure

The function, Server_Write_Procedure, of the form [Server_Write_Procedure (OID_Space_object) ] writes the object designated by the parameter OID_Space_object to disk and unlocks the OID Space object 80.

The following pseudocode demonstrates an embodiment of the implementation of this function.

```
if (current transaction has locked a IUO)
then
    begin-then
    delete old version of IUO_List_Element object
    set IUO_List_Element object to (OID_Space_object)
    set IUO_List_Element modified indicator to true
    set IUO_List_Element transaction locker to 0
    indicate current transaction has not locked an IUO
    end-then
```

Server Commit Procedure

The function, Server_Commit_Procedure, of the form [Server_Commit_Procedure ( )], modifies the IUO_List_Element in the event the client transaction is committed. At commit time, the modified OID Space objects 80 held on the server's list of IUOs are written to disk.

The following pseudocode demonstrates an embodiment of the implementation of this function.

```
for each IUO_List_Element
    begin-for
    if (next IUO_List_Element_modified_indicator is true)
    then
        begin-then
        write the IUO_List_Element object to disk
        set the IUO_List_Element_modified_indicator to false
        end-then
    end-for
continue with normal commit procedure
```

Server Abort Procedure

The function, Server_Abort_Procedure ( ), modifies the IUO_List_Element in the event the client transaction is aborted. When a transaction is aborted, the server checks to see it held any instant update locks (on OID Space objects) and if so, it releases these locks so that other clients may access these objects.

The following pseudocode demonstrates an embodiment of the implementation of this function.

```
if (current transaction has locked an IUO)
then
    begin-then
    set the IUO_List_Element_locker to 0
    indicate the current transaction has not locked an IUO
    end-then
continue with normal abort procedure
```

Server Error Recovery Detection and Correction

It should be noted that if a client application reserves a range of OIDs, and then sometime later, prior to returning or cancelling the reservation, the client application or the server process terminates abnormally while a range of OIDs was reserved, steps must be taken to correct the reservations in the OID Space object. In one embodiment, the OID Space object is recovered by cancelling all apparent reservations.

When the OID Space object 80 requested is not already in memory, the OID Space object 80 is read from disk and the variable Need_Recovery is set to true. The recovery function iterates over the OID Space object's High_Water_Mark vector or bit flag and for each partition clears the bit used to indicate that the corresponding range of OIDs is reserved. Since the OID Space object 80 has just been read into memory, it cannot have any ranges reserved, so any reservations must have been left over from a previous session which terminated abnormally before it could clear this reserved bit.

MISCELLANEOUS FUNCTIONS

In addition to the functions described, one embodiment of the system has also implemented the following functions to provide increased functionality, although these functions need not be implemented to utilize the invention.

Ranges in Use

A function termed Ranges_In_Use, of the form, [Ranges_In_Use], returns a value equal to the number of ranges currently in use. This number equals the number of client applications concurrently allocating OIDs using this OID Space object 80.

The following pseudocode demonstrates an embodiment of the implementation of this function:

```
initialize Range_Count to 0
for each partition
    begin-for
    if (partition is marked in use)
    then
        begin-then
        increment Range_Count
        end-then
    end-for
return Range_Count
```

Highest Range Used

A function termed Highest_Range_Used, of the form [Highest_Range_Used], returns a value equal to the highest range used for OID allocation. It should be noted that while no range higher than the returned range can contain allocated OIDs, the converse is not necessarily true. There may be unused ranges that are lower than the highest range.

For example, if N clients reserved ranges and if K of those clients cancelled their reservations and the Nth client did not cancel, then there could be K ranges which are unused.

The following pseudocode demonstrates an embodiment of the implementation of this function:

```
initialize result to 0
for each partition
    begin-for
    find the high water mark for the partition
    if (high water mark > Start_For_Given_Range (partition))
    then
        begin-then
        result = partition
        end-then
    end-for
return result
```

OID Size

A function Get_OID_Size of the form, [Get_OID_Size] returns a value which is the number of bits in the OID, which is equal to the value of the Number_Of_OID_Bits input parameter to the Create_OID_Space_Object function.

Partitions

A function Get_Number_Of_Partitions of the form, [Get_Number_Of_Partitions] returns a value, which is the number of partitions with which the OID Space object was created. This value will be equal to the Number_Of_Partition_Bits input parameter to the Create_OID_Space_Object function.

EXAMPLE OF OID GENERATION

The overall flow of processing involved in allocating globally unique OIDs is shown below in pseudocode. For the purpose of this example, a server process creates an OID Space object and writes the object to disk. At some later time, a client process requests the OID Space object and the server process reads the OID Space object from disk and locks the object. The client process then sequentially reserves a range of OIDs, allocates OIDs from the reserved range and returns any unused OIDs. The server process then unlocks the OID Space object and writes the OID Space object to disk.

```
/
//Create an OID Space object having a 32 bit OID and 128 partitions
/Write the OID Space object to disk
/
    Create_OID_Space_Object (32, 7)
    Server_Write_Procedure (OID_Space_Object)
/
/Server read and lock OID Space object
/
    Server_Read_Procedure (OID_Space_Object, IUO_Lock)
/
/Reserve a range of OIDs in OID Space object
/
    Reserve_Partition (Beginning_OID_Ending_OID)
    Remember Beginning_OID and Ending_OID
    Set Number_Of_Allocated_OIDs to 0
/
/Server write and unlock OID object with range reserved so that
/other clients can reserve other ranges
/
    Server_Write_Procedure (OID_Space_Object)
/
/Allocate OIDs from the reserved range
/
    increment Number_Of_Allocated_OIDs for each OID allocated
    New_High_Water_Mark = Beginning_OID + Number_Of_Allocated_OIDs
```

```
/
Return the reserved range
/    Read the OID Space object
/    Set new high water mark
/    Write the OID Space object
/
     Server_Read_Procedure (OID_Space_Object, IUO_Lock)
     Set New_High_Water_Mark (New_High_Water_Mark)
     Server_Write_Procedure (OID_Space_Object)
```

It should be noted that although the embodiment described partitions the OID Space object 80 into a finite number of equal partitions, such is not necessary. The function which creates the OID Space object 80 and partitions the object space can, without much more effort, utilize an algorithm to partition the space into unequal partitions. Thus it would be possible to have a number of large partitions to satisfy the needs of client programs creating a large number of objects and a number of smaller partitions for client programs creating few objects.

Further, although the client process presently requests a range, it is also possible for the client process to request a defined number of OIDs (for example 200 OIDs are required) or sets of ranges of OIDs (for example OIDs from 200 to 400 and 800 to 1200). Neither of these modifications will be outside of the general description of the invention as described herein.

Having shown the preferred embodiments, those skilled in the art will realize many variations are possible which will still be within the scope and spirit of the claimed invention. Therefore, it is the intention to limit the invention only as indicated by the scope of the claims.

What is claimed is:

1. A system for allocating a globally unique identifier to an object created in a distributed object oriented database, said system comprising:

a network;

at least two processors connected to said network, one of said at least two processors executing at least one client process and one of said at least two processors executing a globally unique identifier server process;

one of said at least one client process requesting a range of globally unique identifiers from said globally unique identifier server process;

said globally unique identifier server process reserving a range of contiguous globally unique identifiers for said one of said at least one client process requesting a range of globally unique identifiers;

said globally unique identifier server process transmitting a first globally unique identifier and a last globally unique identifier from said range of globally unique identifiers to said one of said at least one client process requesting a range of globally unique identifiers after reserving said range of globally unique identifiers;

said one of said at least one client process requesting a range of globally unique identifiers allocating a globally unique identifier from said range of globally unique identifiers for each object created by said one of said at least one client process requesting a range of globally unique identifiers; and said one of said at least one client process releasing an unused portion of said range of globally unique identifiers to said globally unique identifier server process upon completion of said allocation of globally unique identifiers.

2. The system of claim 1 wherein said range of globally unique identifiers is selected from a plurality of ranges of globally unique identifiers.

3. The system of claim 1 wherein each range of said plurality of ranges of globally unique identifiers contains the same number of globally unique identifiers.

4. The system of claim 2 wherein each range of globally unique identifiers is contiguous.

5. The system of claim 2 wherein said plurality of ranges of globally unique identifiers are maintained in an OID Space object by said globally unique identifier server process.

6. The system of claim 5 wherein said OID Space object is created by said globally unique identifier server process.

7. The system of claim 5 wherein said OID Space object is created by said at least one client process and is transferred to said globally unique identifier server process.

8. The system of claim 1 wherein said at least one client process requesting said range of globally unique identifiers from said globally unique identifier server process specifies a number of globally unique identifiers to be reserved.

9. A system for allocating a globally unique identifier to an object created in a distributed object oriented database, said system comprising:

a network; and at least two processors connected to said network, one of said at least two processors executing at least one client process and one of said at least two processors executing a globally unique identifier server process, one of said at least one client process requesting a range of globally unique identifiers from said globally unique identifier server process, said globally unique identifier server process transmitting an object identifier space object having a plurality of ranges of globally unique identifiers to said one of said at least one client process requesting a range of globally unique identifiers, said one of said at least one client process requesting a range of globally unique identifiers reserving a range of globally unique identifiers within said object identifier space object, said one of said at least one client process requesting a range of globally unique identifiers allocating a globally unique identifier from said reserved range of globally unique identifiers reserved to each object created by said one of said at least one client process requesting a range of globally unique identifiers, said one of said at least one client process requesting a range of globally unique identifiers releasing an unused portion of said reserved range of globally unique identifiers, and said one of said at least one client process requesting a range of globally unique identifiers transmitting said object identifier space object to said globally unique identifier server process.

10. The system of claim 9 wherein said object identifier space object is created by said at least one client process and is transferred to said globally unique identifier server process.

11. The system of claim 9 said globally unique identifier server process includes a locking device which locks said object identifier space object prior to transmitting said object identifier space object having said plurality of ranges of globally unique identifiers to said one of said at least one client process requesting a range of globally unique identifiers.

12. The system of claim 9 wherein said one of said at least one client process requesting a range of globally unique identifiers unlocks and returns said object identifier space object prior to allocating said globally unique identifier from said reserved range of globally unique identifiers to each object.

13. A method for allocating a globally unique identifier to an object created in a distributed object oriented database, by at least one client process, said method comprising:

requesting, by said at least one client process, a range of globally unique object identifiers from a server process;

reserving, by said server process, a range of contiguous object identifiers to said at least one client process;

transmitting, by said server process, a first globally unique identifier and a last globally unique identifier from said reserved range of globally unique identifiers to said at least one client process;

allocating, by said at least one client process, a globally unique object identifier to each object created by said at least one client process from said transmitted range of object identifiers; and releasing, by said at least one client process, an unused portion of said range of object identifiers to said server process upon completion of said allocation of said globally unique object identifiers.

14. A method for allocating a globally unique identifier to an object created, by at least one client process, in a distributed object oriented database having a network, said method comprising:

requesting, by said at least one client process, a range of globally unique identifiers from a server process;

transmitting, by said server process, an object identifier space object having a plurality of ranges of globally unique identifiers to said at least one client process in response to said request;

reserving, by said at least one client process, a range of globally unique identifiers within said object identifier space object to said at least one client process;

allocating, by said at least one client process, a globally unique identifier from said reserved range of globally unique identifiers reserved to each object created by said at least one client process requesting a range of globally unique identifiers;

releasing, by said at least one client process, an unused portion of said reserved range of globally unique identifiers; and returning said object identifier space object by said at least one client process to said server process.

* * * * *

UNITED STATES PATENT AND TRADEMARK OFFICE
CERTIFICATE OF CORRECTION

PATENT NO. : 5,522,077
DATED : May 28, 1996
INVENTOR(S) : Winslow R. Cuthbert, et al.

It is certified that error appears in the above-identified patent and that said Letters Patent is hereby corrected as shown below:

Column 3, line 65, "OIDs" should read --OIDs--.

Column 4, lines 62 and 63, "(Number$_{13}$ Of$_{13}$ OIDs," should read --(Number_Of_OIDs,--.

Column 6, line 5, "OIDs" should read --OIDs--.

Column 7/8, in the chart, line 19, "begin_for" should read --begin-for--.

Column 11, line 33, "the list" should read --in the list--.

Column 13/14, Table at end of page, line 8, "(Beginning_OID_Ending_OID)" should read --(Beginning_OID,Ending_OID)--.

Column 16, line 15, "The system of claim 1" should read --The system of claim 2--.

Column 16, line 21, "OID" should read --OID--.

Signed and Sealed this

Eleventh Day of August 1998

*Attest:*

BRUCE LEHMAN

*Attesting Officer*  *Commissioner of Patents and Trademarks*